United States Patent [19]

(12) United States Patent
Liu et al.

(10) Patent No.: US 11,903,484 B2
(45) Date of Patent: Feb. 20, 2024

(54) COLLISION PREVENTION CONTROL SYSTEM BASED ON ELECTRIC LIFTING TABLE AND COLLISION PREVENTION METHOD THEREOF

(71) Applicant: DewertOkin Technology Group Co., Ltd., Zhejiang (CN)

(72) Inventors: Hui Liu, Zhejiang (CN); Long Li, Zhejiang (CN)

(73) Assignee: DewertOkin Technology Group Co., Ltd., Zhejiang (CN)

( * ) Notice: Subject to any disclaimer, the term of this patent is extended or adjusted under 35 U.S.C. 154(b) by 278 days.

(21) Appl. No.: 17/425,335

(22) PCT Filed: Dec. 27, 2018

(86) PCT No.: PCT/CN2018/124302
§ 371 (c)(1),
(2) Date: Jul. 23, 2021

(87) PCT Pub. No.: WO2020/113727
PCT Pub. Date: Jun. 11, 2020

(65) Prior Publication Data
US 2022/0087409 A1     Mar. 24, 2022

(30) Foreign Application Priority Data

Dec. 4, 2018 (CN) .......................... 201811476259.8

(51) Int. Cl.
*A47B 9/00* (2006.01)
*G05B 19/4155* (2006.01)
*G01P 15/18* (2013.01)

(52) U.S. Cl.
CPC ............ *A47B 9/00* (2013.01); *G05B 19/4155* (2013.01); *A47B 2200/006* (2013.01); *G01P 15/18* (2013.01); *G05B 2219/40339* (2013.01)

(58) Field of Classification Search
CPC ..... A47B 2200/006; A47B 9/00; G01P 15/18; G05B 19/4155; G05B 2219/40339
See application file for complete search history.

(56) References Cited

U.S. PATENT DOCUMENTS

2014/0081592 A1* 3/2014 Bellusci ............. G01R 33/0023
702/141
2017/0265044 A1* 9/2017 Lundsgaard ............ G01S 19/05
(Continued)

FOREIGN PATENT DOCUMENTS

CN     106473449     3/2017
CN     106515739     3/2017
(Continued)

OTHER PUBLICATIONS

"International Search Report (Form PCT/ISA/210) of PCT/CN2018/124302," dated Sep. 11, 2019, with English translation thereof, pp. 1-4.
(Continued)

*Primary Examiner* — Matthew W Ing
(74) *Attorney, Agent, or Firm* — JCIPRNET

(57) ABSTRACT

A collision prevention control system based on an electric lifting table and a collision prevention method thereof are provided. The collision prevention control system includes a lifting table, an electronic lifting table control box disposed on the lifting table, and a single-chip microcomputer disposed in the electric lifting table control box. The electric lifting table control box is internally provided with an acceleration and gyroscope chip, the acceleration and gyroscope chip performing synchronous motion with the lifting table, the acceleration and gyroscope chip being in information interaction with the single-chip microcomputer, and motion control on the lifting table being performed through the single-chip microcomputer. The collision prevention control system has the advantageous effects as follows: has (Continued)

higher sensitivity and more reliable operation, and senses a slight angular change or an acceleration change when the lifting table encounters resistance.

8 Claims, 3 Drawing Sheets

(56) References Cited

U.S. PATENT DOCUMENTS

2021/0030146 A1* 2/2021 Riebner ............... A47B 9/00
2021/0145164 A1* 5/2021 Lu ....................... A47B 9/16

FOREIGN PATENT DOCUMENTS

| CN | 108515972 | 9/2018 |
| CN | 108663045 | 10/2018 |

OTHER PUBLICATIONS

"Written Opinion of the International Searching Authority (Form PCT/ISA/237) of PCT/ CN2018/124302," dated Sep. 11, 2019, pp. 1-4.

\* cited by examiner

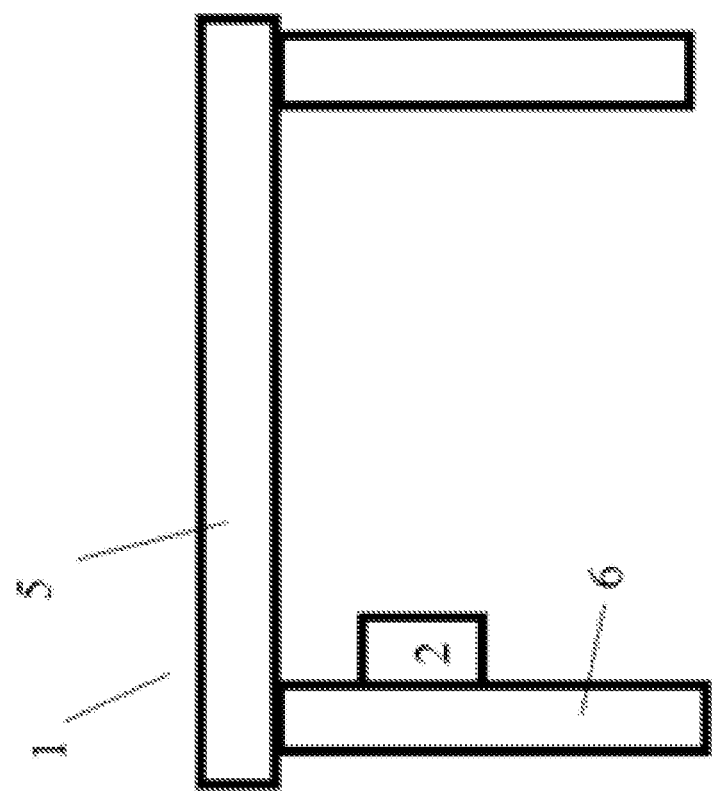
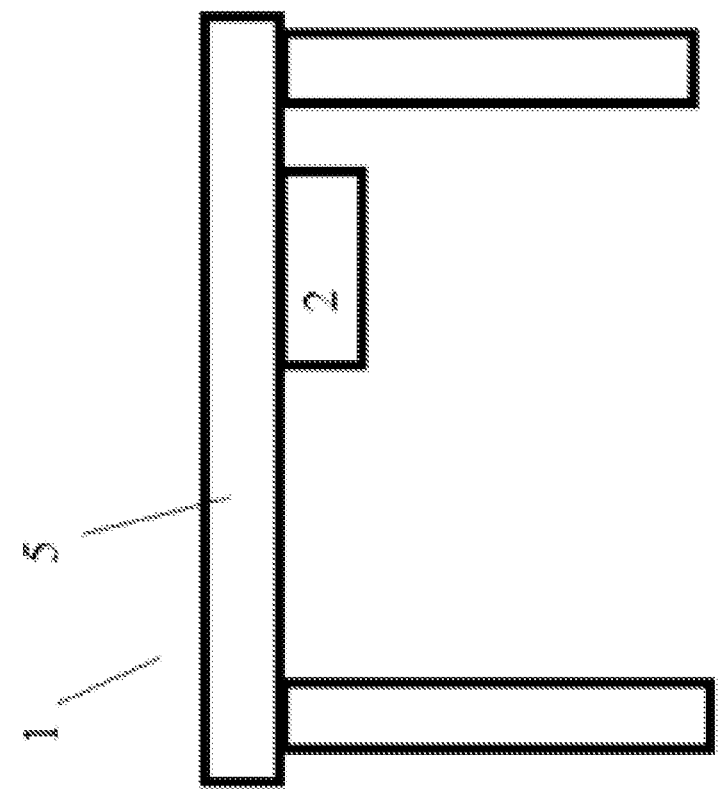
FIG. 5A
FIG. 5B

COLLISION PREVENTION CONTROL SYSTEM BASED ON ELECTRIC LIFTING TABLE AND COLLISION PREVENTION METHOD THEREOF

CROSS-REFERENCE TO RELATED APPLICATION

This application is a 371 of international application of PCT application Ser. No. PCT/CN2018/124302, filed on Dec. 27, 2018, which claims the priority benefit of China application no. 201811476259.8, filed on Dec. 4, 2018. The entirety of each of the above mentioned patent applications is hereby incorporated by reference herein and made a part of this specification.

FIELD OF TECHNOLOGY

The present invention relates to the technical field of collision prevention of an electric lifting table, and in particular, relates to a collision prevention control system based on an electric lifting table and a collision prevention method thereof.

BACKGROUND

For an electric lifting table with basic lifting functions, safety performance in a lifting process is a crucial property when an obstacle is encountered.

A current electric lifting table judges whether resistance is encountered or not by detecting current of a motor. When resistance is encountered in an operation process, a change will occur to current of the motor. The defect of the method lies in poor sensitivity, as only large resistance can be effectively sensed, resulting in low safety. Alternatively, a controller for detecting resistance with a vibration sensor can be used. Resistance can be detected when vibration of a table is caused by resistance encountered in an operation process.

SUMMARY

For the problems existing in the prior art, the present invention provides a reasonably-structured and accurately-controlled collision prevention control system based on an electric lifting table and a collision prevention method thereof.

The technical solution of the present invention is as follows:

a collision prevention control system based on an electric lifting table, comprising a lifting table, an electronic lifting table control box disposed on the lifting table, and a single-chip microcomputer disposed in the electric lifting table control box, characterized in that the electric lifting table control box is internally provided with an acceleration and gyroscope chip, the acceleration and gyroscope chip performing synchronous motion with the lifting table, and the acceleration and gyroscope chip being in information interaction with the single-chip microcomputer and motion control on the lifting table being performed through the single-chip microcomputer.

The collision prevention control system based on an electric lifting table is characterized in that the electric lifting table control box is carried on a panel bottom of the lifting table or a moving member of the lifting table.

A collision prevention method of the collision prevention control system based on an electric lifting table is characterized by comprising the following steps:

1) building a $X_2$-$Y_2$-$Z_2$ coordinate system with reference to a ground plane, building a $X_1$-$Y_1$-$Z_1$ coordinate system of the acceleration and gyroscope chip; and sensing accelerations and motion angular velocities for three axial directions of the $X_1$-$Y_1$-$Z_1$ coordinate system through the acceleration and gyroscope chip;

2) when the lifting table (1) stays still or moves at a constant speed, the acceleration and gyroscope chip being subjected to a gravity acceleration only, in which case the acceleration and gyroscope chip is parallel with ground, such that there is a gravity acceleration in direction $Z_1$ only, and gravity acceleration components in axis $X_1$ and axis $Y_1$ are both 0;

3) when the lifting table is tilted with respect to ground, the gravity acceleration of the acceleration and gyroscope chip respectively generating components on the axes $X_1$, $Y_1$ and $Z_1$, and obtaining a tilting angle of the acceleration and gyroscope chip at this moment according to a component value;

4) during a process for the lifting table to change from one angle to another angle, the acceleration and gyroscope chip generating a rotational motion on at least one axis of the axes $X_1$, axis $Y_1$ and axis $Z_1$, using a method of calculating an angle with the gravity acceleration and a method of calculating an angle with a rotational angular velocity of a gyroscope to respectively obtain an angular variation at the moment, and with an initial angle value, thus obtaining a current angle value;

5) using a Kalman Filter Algorithm with the angular variation of an angle calculated through the gravity acceleration in the step 4) as a measuring value of the Kalman Filter Algorithm and the angular variation of an angle calculated through the rotational angular velocity of the gyroscope as a process, and obtaining an estimation closest to a true value through the Kalman Filter Algorithm;

6) through the angular variation obtained by calculation in the step 5), judging whether resistance is encountered or not, thus enabling the single-chip microcomputer to make a corresponding control response.

The collision prevention method of the collision prevention control system based on an electric lifting table is characterized in that the using a method of calculating an angle with a gravity acceleration in the step 4) comprises: since the gravity acceleration is always perpendicular to ground plane, respectively generating components $a_x$ and $a_z$ on the axis $X_1$ and the axis $Z_1$ when the acceleration and gyroscope chip rotates at an angle of $\alpha$ around axis $Y_1$, wherein $a_x$ and $a_z$ are read from the acceleration and gyroscope chip through the single-chip microcomputer, thereby obtaining $\alpha = \arctan g(a_x/a_z)$; and respectively generating components $a_y$ and $a_z$ on the axis $Y_1$ and the axis $Z_1$ when the acceleration and gyroscope chip rotates at an angle of $\beta$ around axis the $X_1$, wherein $a_y$ and $a_z$ are read from the acceleration and gyroscope chip through the single-chip microcomputer, thereby obtaining $\beta = \arctan g(a_y/a_z)$.

The collision prevention method of the collision prevention control system based on an electric lifting table is characterized in that the using a method of calculating an angle with a rotational angular velocity of a gyroscope in the step 4) comprises: sampling at an interval T time, reading angular velocities of $W_0$ and $W_k$ of a corresponding time from the acceleration and gyroscope chip through the single-chip microcomputer from a time $T_0$ to a final time $T_k$, wherein an angle at time $T_0$ is 0, then an angle corresponding to the time $T_k$ is a=0+W0*T+W1*T+W2*T+ . . . +Wk−1*T.

The collision prevention method of the collision prevention control system based on an electric lifting table is characterized in that a method of judging whether resistance is encountered or not in the step 6) comprises comparing the angular variation obtained through the step 5) with a threshold value, wherein if the angular variation exceeds a set threshold value, it is deemed that resistance is encountered by a tabletop; otherwise, it is deemed that resistance is not encountered by the tabletop.

The present invention has the advantageous effects as follows: by being disposed with the acceleration and gyroscope chip, the system effectively realizes detection of resistance encountered, which has higher sensitivity and more reliable operation, and senses a slight angular change or an acceleration change when the lifting table encounters resistance, so as to judge whether resistance is encountered or not in an operation process of the lifting table.

BRIEF DESCRIPTION OF THE DRAWINGS

FIG. 5A and FIG. 5B are schematic diagrams of the collision prevention control system.

Of the drawings, 1-lifting table, 2-electric lifting table control box, 3-single-chip microcomputer, 4-acceleration and gyroscope chip, and 5-panel, and 6-moving member.

DESCRIPTION OF THE EMBODIMENTS

The following further describes the present invention in corporation with the drawings accompanying the description.

Figure 1:
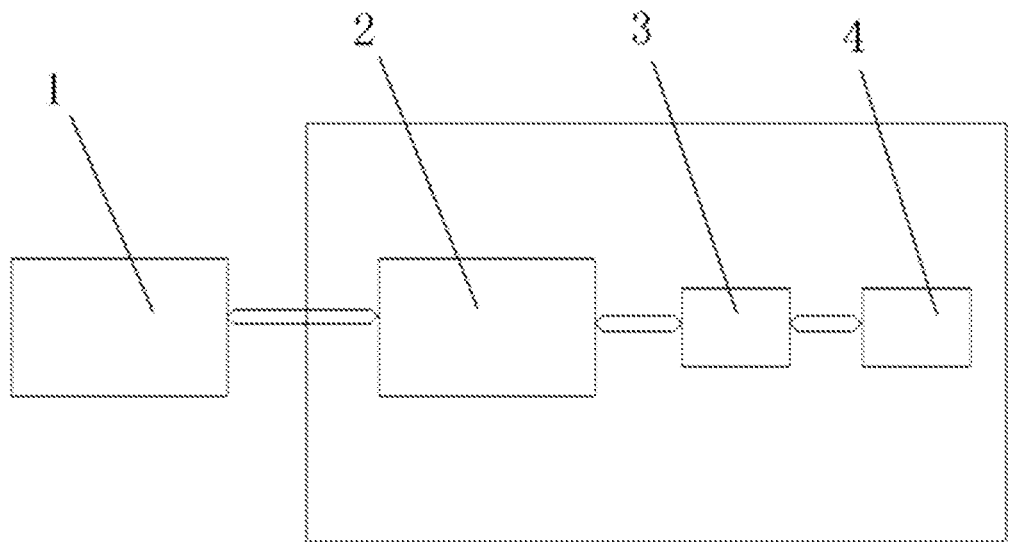
FIG. 1 is a block diagram of a control process of the present invention.
Figure 2:
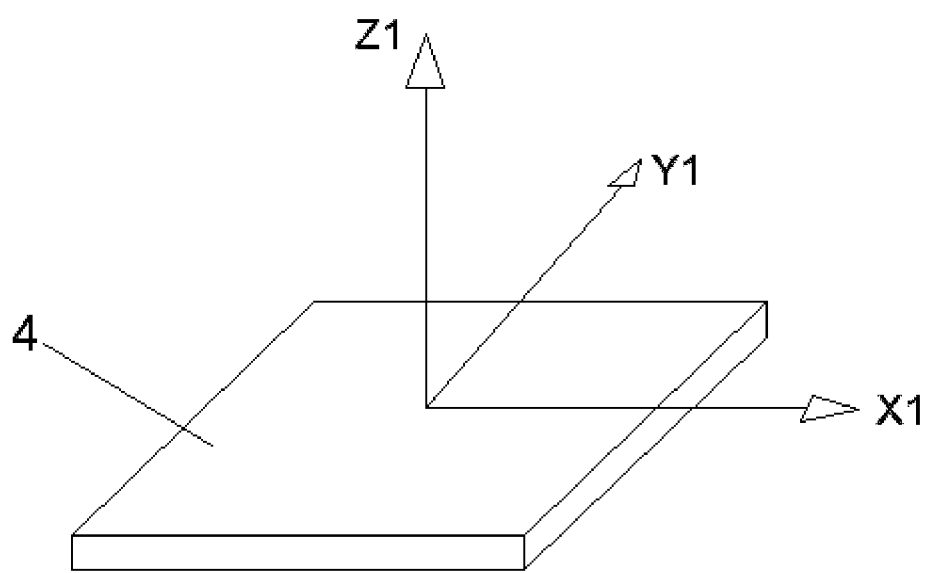
FIG. 2 is a coordinate system diagram of an acceleration and gyroscope chip of the present invention.
Figure 3:
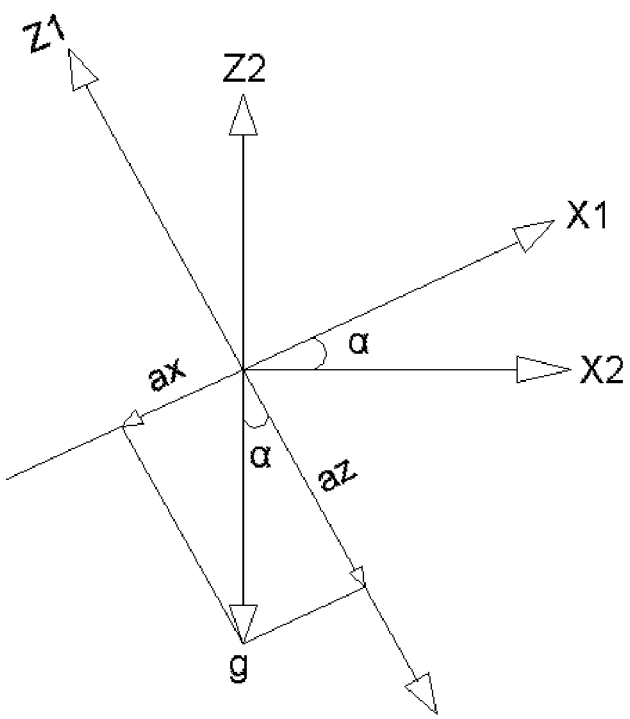
FIG. 3 is a schematic diagram of an acceleration and gyroscope chip of the present invention that rotates at an angle of α around the axis $Y_1$.
Figure 4:
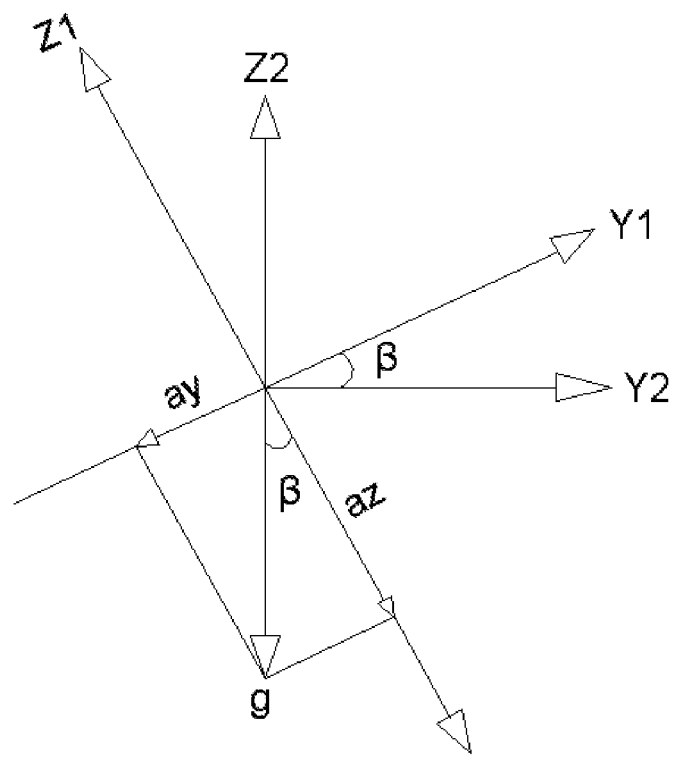
FIG. 4 is a schematic diagram of an acceleration and gyroscope chip of the present invention that rotates at an angle of β around the axis $X_1$.

As shown in FIGS. 1-4, a collision prevention control system based on an electric lifting table comprises a lifting table 1, an electric lifting table control box 2, a single-chip microcomputer 3 and an acceleration and gyroscope chip 4 (the acceleration and gyroscope chip 4 is a current electronic component of a mobile phone or a balance bike for measuring a motion trail of the mobile phone or an angle of the balance bike).

The electronic lifting table control box 2 is disposed on a panel 5 bottom of the lifting table 1 (as shown in FIG. 5A) or a moving member 6 of the lifting table 1 (as shown in FIG. 5B); the single-chip microcomputer 3 is disposed in the electric lifting table control box 2 for controlling a driving system of the lifting table; and the electric lifting table control box 2 is internally provided with an acceleration and gyroscope chip 4, the acceleration and gyroscope chip 4 performing synchronous motion with the lifting table 1, and the acceleration and gyroscope chip 4 being in information interaction with the single-chip microcomputer 3 and motion control on the lifting table 1 being performed through the single-chip microcomputer 3.

A collision prevention method of a collision prevention control system based on an electric lifting table comprises specific steps as follows:

1) building a $X_2$-$Y_2$-$Z_2$ coordinate system with reference to a ground plane, building a $X_1$-$Y_1$-$Z_1$ coordinate system of the acceleration and gyroscope chip 4; and sensing accelerations and motion angular velocities for three axial directions of the $X_1$-$Y_1$-$Z_1$ coordinate system through the acceleration and gyroscope chip;

2) when the lifting table stays still or moves at a constant speed, the acceleration and gyroscope chip being subjected to a gravity acceleration only, in which case the acceleration and gyroscope chip is parallel with ground, such that there is a gravity acceleration in direction $Z_1$ only, and gravity acceleration components in axis $X_1$ and axis $Y_1$ are both 0;

3) when the lifting table is tilted with respect to ground, the gravity acceleration of the acceleration and gyroscope chip respectively generating components on the axes $X_1$, $Y_1$ and $Z_1$, and obtaining a tilting angle of the acceleration and gyroscope chip at the moment according to a component value;

4) during a process for the lifting table to change from one angle to another angle (a change occurs to an angle after collision occurs to a tabletop), the acceleration and gyroscope chip generating a rotational motion on at least one axis of the axes $X_1$, $Y_1$ and $Z_1$, using a method of calculating an angle with the gravity acceleration and a method of calculating an angle with a rotational angular velocity of a gyroscope to respectively obtain an angular variation at the moment, and with an initial angle value, thus obtaining a current angle value;

wherein the using a method of calculating an angle with a gravity acceleration in the step 4) comprises: since the gravity acceleration is always perpendicular to ground plane, respectively generating components $a_x$ and $a_z$ on the axis $X_1$ and the axis $Z_1$ when the acceleration and gyroscope chip rotates at an angle of α around axis $Y_1$, wherein $a_x$ and $a_z$ are read from the acceleration and gyroscope chip 4 through the single-chip microcomputer 3, thereby obtaining α=arctan $g(a_x/a_z)$; and respectively generating components $a_y$ and $a_z$ on the axis $Y_1$ and the axis $Z_1$ when the acceleration and gyroscope chip rotates at an angle of β around the axis $X_1$, wherein $a_y$ and $a_z$ are read from the acceleration and gyroscope chip 4 through the single-chip microcomputer 3, thereby obtaining β=arctan $g(a_y/a_z)$. (It should be noted that an angle of the acceleration and gyroscope chip rotating about the direction of the axis $Z_1$ is not considered in the application).

wherein the using a method of calculating an angle with a rotational angular velocity of a gyroscope in the step 4) comprises: sampling at an interval T time and reading angular velocities of $W_0$ and $W_k$ of a corresponding time from the acceleration and gyroscope chip through the single-chip microcomputer from a time $T_0$ to a final time $T_k$, wherein an angle at time $T_0$ is 0, then an angle corresponding to the time $T_k$ is a=0+W0*T+W1*T+W2*T+ . . . +Wk−1* T.

5) using a Kalman Filter Algorithm with the angular variation of an angle calculated through the gravity acceleration in the step 4) as a measuring value of the Kalman Filter Algorithm and the angular variation of an angle calculated through a rotational angular velocity of a gyroscope as a process, and obtaining an estimation closest to a true value through the Kalman Filter Algorithm;

6) through the angular variation obtained by calculation in the step 5), judging whether resistance is encountered or not, thus enabling the single-chip microcomputer 3 to make a corresponding control response. The method of judging whether resistance is encountered or not comprises comparing the angular variation obtained through the step 5) with a threshold value, wherein if the angular variation exceeds a set threshold value, it is deemed that resistance is encountered by a tabletop; otherwise, it is deemed that resistance is not encountered by the tabletop.

What is claimed is:

1. A collision prevention method of a collision prevention control system based on an electric lifting table, comprising an electronic lifting table control box disposed on the lifting table, and a single-chip microcomputer disposed in the electric lifting table control box, the electric lifting table control box being internally provided with an acceleration and gyroscope chip, the acceleration and gyroscope chip performing synchronous motion with the lifting table, the acceleration and gyroscope chip being in information interaction with the single-chip microcomputer, and motion control on the lifting table being performed through the single-chip microcomputer, the method comprising the following steps:

1) building a $X_2$-$Y_2$-$Z_2$ coordinate system with reference to a ground plane, building a $X_1$-$Y_1$-$Z_1$ coordinate system of the acceleration and gyroscope chip; and sensing accelerations and motion angular velocities for three axial directions of the $X_1$-$Y_1$-$Z_1$ coordinate system through the acceleration and gyroscope chip;

2) when the lifting table stays still or moves at a constant speed, the acceleration and gyroscope chip being subjected to a gravity acceleration only, in which case the acceleration and gyroscope chip is parallel with ground, such that there is a gravity acceleration in direction $Z_1$ only, and gravity acceleration components in axis $X_1$ and axis $Y_1$ are both 0;

3) when the lifting table is tilted with respect to ground, the gravity acceleration of the acceleration and gyroscope chip respectively generating components on the axes $X_1$, $Y_1$ and $Z_1$, and obtaining a tilting angle of the acceleration and gyroscope chip at this moment according to a component value;

4) during a process for the lifting table to change from one angle to another angle, the acceleration and gyroscope chip generating a rotational motion on at least one axis of the axes $X_1$, $Y_1$ and $Z_1$, using a method of calculating an angle with the gravity acceleration and a method of calculating an angle with a rotational angular velocity of a gyroscope to respectively obtain an angular variation at the moment and with an initial angle value, thus obtaining a current angle value;

5) using a Kalman Filter Algorithm with the angular variation of an angle calculated through the gravity acceleration in the step 4) as a measuring value of the Kalman Filter Algorithm and the angular variation of an angle calculated through the rotational angular velocity of the gyroscope as a process value, and fusing the two values through the Kalman Filter Algorithm, thus obtaining an angular estimation closest to a true value;

6) through the angular variation obtained by calculation in the step 5), judging whether resistance is encountered or not, thus enabling the single-chip microcomputer to make a corresponding control response.

2. The collision prevention method of the collision prevention control system based on an electric lifting table according to claim 1, wherein the using a method of calculating an angle with a gravity acceleration in the step 4) comprises: since the gravity acceleration is always perpendicular to ground plane, respectively generating components $a_x$ and $a_z$ on the axis $X_1$ and the axis $Z_1$ when the acceleration and gyroscope chip rotates at an angle of α around the axis $Y_1$, wherein $a_x$ and $a_z$ are read from the acceleration and gyroscope chip through the single-chip microcomputer, thereby obtaining α=arctang($a_x$/$a_z$); and respectively generating components $a_y$ and $a_z$ on the axis $Y_1$ and the axis $Z_1$ when the acceleration and gyroscope chip rotates at an angle of β around the axis $X_1$, wherein $a_y$ and $a_z$ are read from the acceleration and gyroscope chip through the single-chip microcomputer, thereby obtaining β=arctang($a_y$/$a_z$).

3. The collision prevention method of the collision prevention control system based on an electric lifting table according to claim 1, wherein the using a method of calculating an angle with a rotational angular velocity of a gyroscope in the step 4) comprises: sampling at an interval T time, reading angular velocities of $W_0$ and $W_k$ of a corresponding time from the acceleration and gyroscope chip through the single-chip microcomputer from a time $T_0$ to a final time $T_k$, wherein an angle at the time $T_0$ is 0, then an angle corresponding to the time $T_k$ is a=0+W0*T+W1*T+W2*T+ . . . +Wk−1*T.

4. The collision prevention method of the collision prevention control system based on an electric lifting table according to claim 1, wherein a method of judging whether resistance is encountered or not in the step 6) comprises comparing the angular variation obtained through the step 5) with a threshold value, wherein if the angular variation exceeds a set threshold value, it is deemed that resistance is encountered by a tabletop; otherwise, it is deemed that resistance is not encountered by the tabletop.

5. A collision prevention method of a collision prevention control system based on an electric lifting table, comprising an electronic lifting table control box disposed on the lifting table, and a single-chip microcomputer disposed in the electric lifting table control box, the electric lifting table control box being internally provided with an acceleration and gyroscope chip, the acceleration and gyroscope chip performing synchronous motion with the lifting table, the acceleration and gyroscope chip being in information interaction with the single-chip microcomputer, and motion control on the lifting table being performed through the single-chip microcomputer, wherein the electric lifting table control box is carried on a panel bottom of the lifting table or a moving member of the lifting table, the method comprising the following steps:

1) building a $X_2$-$Y_2$-$Z_2$ coordinate system with reference to a ground plane, building a $X_1$-$Y_1$-$Z_1$ coordinate system of the acceleration and gyroscope chip; and sensing accelerations and motion angular velocities for three axial directions of the $X_1$-$Y_1$-$Z_1$ coordinate system through the acceleration and gyroscope chip;

2) when the lifting table stays still or moves at a constant speed, the acceleration and gyroscope chip being subjected to a gravity acceleration only, in which case the acceleration and gyroscope chip is parallel with ground, such that there is a gravity acceleration in direction $Z_1$ only, and gravity acceleration components in axis $X_1$ and axis $Y_1$ are both 0;

3) when the lifting table is tilted with respect to ground, the gravity acceleration of the acceleration and gyroscope chip respectively generating components on the axes $X_1$, $Y_1$ and $Z_1$, and obtaining a tilting angle of the acceleration and gyroscope chip at this moment according to a component value;

4) during a process for the lifting table to change from one angle to another angle, the acceleration and gyroscope chip generating a rotational motion on at least one axis of the axes $X_1$, $Y_1$ and $Z_1$, using a method of calculating an angle with the gravity acceleration and a method of calculating an angle with a rotational angular velocity of a gyroscope to respectively obtain an angular variation at the moment and with an initial angle value, thus obtaining a current angle value;

5) using a Kalman Filter Algorithm with the angular variation of an angle calculated through the gravity acceleration in the step 4) as a measuring value of the Kalman Filter Algorithm and the angular variation of an angle calculated through the rotational angular velocity of the gyroscope as a process value, and fusing the two values through the Kalman Filter Algorithm, thus obtaining an angular estimation closest to a true value;

6) through the angular variation obtained by calculation in the step 5), judging whether resistance is encountered or not, thus enabling the single-chip microcomputer to make a corresponding control response.

6. The collision prevention method of the collision prevention control system based on an electric lifting table according to claim 5, wherein the using a method of calculating an angle with a gravity acceleration in the step 4) comprises: since the gravity acceleration is always perpendicular to ground plane, respectively generating components $a_x$ and $a_z$ on the axis $X_1$ and the axis $Z_1$ when the acceleration and gyroscope chip rotates at an angle of a around the axis $Y_1$, wherein $a_x$ and $a_z$ are read from the acceleration and gyroscope chip through the single-chip microcomputer, thereby obtaining $\alpha=\arctan(a_x/a_z)$; and respectively generating components $a_y$ and $a_z$ on the axis $Y_1$ and the axis $Z_1$ when the acceleration and gyroscope chip rotates at an angle of β around the axis $X_1$, wherein $a_y$ and $a_z$ are read from the acceleration and gyroscope chip through the single-chip microcomputer, thereby obtaining $\beta=\arctan(a_y/a_z)$.

7. The collision prevention method of the collision prevention control system based on an electric lifting table according to claim 5, wherein the using a method of calculating an angle with a rotational angular velocity of a gyroscope in the step 4) comprises: sampling at an interval T time, reading angular velocities of $W_0$ and $W_k$ of a corresponding time from the acceleration and gyroscope chip through the single-chip microcomputer from a time $T_0$ to a final time $T_k$, wherein an angle at the time $T_0$ is 0, then an angle corresponding to the time $T_k$ is $a=0+W0*T+W1*T+W2*T+\ldots+Wk-1*T$.

8. The collision prevention method of the collision prevention control system based on an electric lifting table according to claim 5, wherein a method of judging whether resistance is encountered or not in the step 6) comprises comparing the angular variation obtained through the step 5) with a threshold value, wherein if the angular variation exceeds a set threshold value, it is deemed that resistance is encountered by a tabletop; otherwise, it is deemed that resistance is not encountered by the tabletop.

* * * * *